US012321984B2

(12) United States Patent
Plenet de Badts de Cugnac

(10) Patent No.: US 12,321,984 B2
(45) Date of Patent: Jun. 3, 2025

(54) SYSTEM AND METHOD FOR ASSETIZATION OF A REVENUE STREAM

(71) Applicant: Assetize SARL, Luxembourg (LU)

(72) Inventor: Charles Plenet de Badts de Cugnac, Dubai (AE)

(73) Assignee: Assetize SARL, Luxembourg (LU)

( * ) Notice: Subject to any disclaimer, the term of this patent is extended or adjusted under 35 U.S.C. 154(b) by 0 days.

(21) Appl. No.: 18/353,877

(22) Filed: Jul. 17, 2023

(65) Prior Publication Data

US 2024/0029155 A1    Jan. 25, 2024

Related U.S. Application Data

(63) Continuation of application No. 17/868,897, filed on Jul. 20, 2022, now Pat. No. 11,704,732.

(51) Int. Cl.
*G06Q 40/03* (2023.01)
*G06Q 20/06* (2012.01)
*H04L 9/32* (2006.01)

(52) U.S. Cl.
CPC .......... *G06Q 40/03* (2023.01); *G06Q 20/065* (2013.01); *H04L 9/3213* (2013.01); *H04L 2209/56* (2013.01)

(58) Field of Classification Search
CPC .... G06Q 40/03; G06Q 20/065; H04L 9/3213; H04L 2209/56
USPC ......................................................... 705/38
See application file for complete search history.

(56) References Cited

U.S. PATENT DOCUMENTS

| | | | |
|---|---|---|---|
| 7,620,595 B1* | 11/2009 | Holt et al. ...................... 705/38 |
| 7,747,518 B2 | 6/2010 | Caballero et al. |
| 10,438,290 B1 | 10/2019 | Winklevoss et al. |
| 11,068,978 B1* | 7/2021 | Ferreira .............. G06Q 40/025 |
| 11,501,367 B2* | 11/2022 | Cella .................... G06Q 40/025 |
| 11,748,822 B2* | 9/2023 | Cella ...................... G06Q 50/01 |
| 2009/0248573 A1 | 10/2009 | Haggerty et al. |
| 2014/0358766 A1 | 12/2014 | Nayyar et al. |
| 2019/0220813 A1 | 7/2019 | Madisetti et al. |
| 2020/0042995 A1 | 2/2020 | Snow et al. |
| 2020/0042998 A1 | 2/2020 | Mendhi et al. |
| 2020/0265511 A1 | 8/2020 | Silveira et al. |
| 2020/0342539 A1 | 10/2020 | Doney |
| 2021/0142302 A1 | 5/2021 | Anderson et al. |
| 2022/0058732 A1 | 2/2022 | Reses |
| 2022/0172214 A1* | 6/2022 | Baltsan et al. ..... G06Q 20/4016 |

(Continued)

FOREIGN PATENT DOCUMENTS

KR       102467373 B1    11/2022

OTHER PUBLICATIONS

Luo et al., Blockchain architecture and its applications in bank risk mitigation framework, May 28, 2021, School of Economics, Xihua University, Chengdu, P.R. China. (Year: 2021).*

(Continued)

*Primary Examiner* — Scott C Anderson
*Assistant Examiner* — George N. Proios
(74) *Attorney, Agent, or Firm* — Jubin Dana; Dana Legal Services

(57) ABSTRACT

A system includes a payment gateway that is configured to directly access a revenue stream and financial information about the revenue stream. The system continuously processes financial information about a borrower and the borrower's revenue stream to continuously analyze and score the revenue stream.

17 Claims, 10 Drawing Sheets

(56) References Cited

U.S. PATENT DOCUMENTS

2022/0284419 A1* 9/2022 Tedesco et al. .... G06Q 20/3678
2022/0343325 A1 10/2022 Hu

OTHER PUBLICATIONS

Andolfatto et al., The Blockchain Revolution: Decoding Digital Currencies, Third Quarter 2022, Review—Federal Reserve Bank of St. Louis, 104.3:149-165. (Year: 2022).*
OECD (2021), Artificial Intelligence, Machine Learning and Big Data in Finance: Opportunities, Challenges and Implications for Policy Makers, 2021, https://www.oecd.org/financial/artificial-intelligence-machine-learning-big-data-in-finance.htm. (Year: 2021).*
Taylor, The Robots Are Coming To Corporate Finance, May 1, 2018, Forbes Technology Council, www.forbes.com. (Year: 2018).*
OECD, Artificial Intelligence, Machine Learning and Big Data in Finance: Opportunities, Challenges and Implications for PolicyMakers, https://www.oecd.org/financial/artificial-intelligence-machine-learning-big-data-in-finance.html. (Year: 2021).
Shukla Arpit et al: "DeLend: A P2P Loan Management Scheme Using Public Blockchain in 6G Network", ICC 2021—IEEE International Conference on Communications, IEEE, Jun. 14, 2021 (Jun. 14, 2021), pp. 1-6, XP033953510, DOI: 10.1109/ICC42927.2021. 9500542 [retrieved on Jul. 28, 2021].

* cited by examiner

SYSTEM AND METHOD FOR ASSETIZATION OF A REVENUE STREAM

CROSS REFERENCE TO RELATED APPLICATION

This application is a continuation of U.S. application Ser. No. 17/868,897 Filed on Jul. 20, 2022 and titled SYSTEM FOR STREAMLINED ASSETIZATION OF REVENUE STREAM (issues on Jul. 18, 2023 as U.S. Pat. No. 11,704, 732), the entire disclosure of which is incorporated herein by reference.

BACKGROUND

Online lending can be direct, private, or peer-to-peer (P2P). A party interested in obtaining a loan typically completes an online application. The application is evaluated, risk and credit rating of the applicant are determined, and an appropriate interest rate range is determined. The determined loan terms are then communicated to borrower, who acknowledges with desired loan terms. Once a lender accepts the borrower's desired loan terms, an agreement is generated. Then the lender forwards loan funds to the borrower. The borrower repays the loan by making periodic loan payments.

The technology and process for applying for a loan are non-linear, inconsistent, and time-consuming. Moreover, if financial conditions of the borrower improve, and the borrower seeks an additional loan, the borrower must go through the loan process again. Processing the additional loan taxes the computational resources of the lending platform, as it consumes additional memory, network bandwidth, and processor cycles. Therefore, what is needed is the ability to manage repayments using revenue generated.

SUMMARY

In accordance with various embodiments and aspects herein, computer systems, methods and computer-readable media comprise a unit or a processor or a payment gateway configured to directly access a revenue stream and financial information about the revenue stream; a machine learning (ML) model trained to continuously process the financial information about the revenue stream to continuously analyze and score the revenue stream; and a smart contract factory, responsive to the scoring by the ML model, for generating at least one smart contract on a distributed, decentralized network. The smart contract is programmed to receive payments in stablecoins with respect to revenue stream.

In accordance with various embodiments and aspects herein, computer systems, methods and computer-readable media comprise a system that includes: a payment unit, which can access and control the revenue (for example, accounts receivable) of a company; and a lending unit, which provides funds from at least one lender to the company. In accordance with various embodiments and aspects herein, the system can optionally include a data system, a marketplace system, and a trading system with or without a decentralized module. The computer system also includes a back end and a front end.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
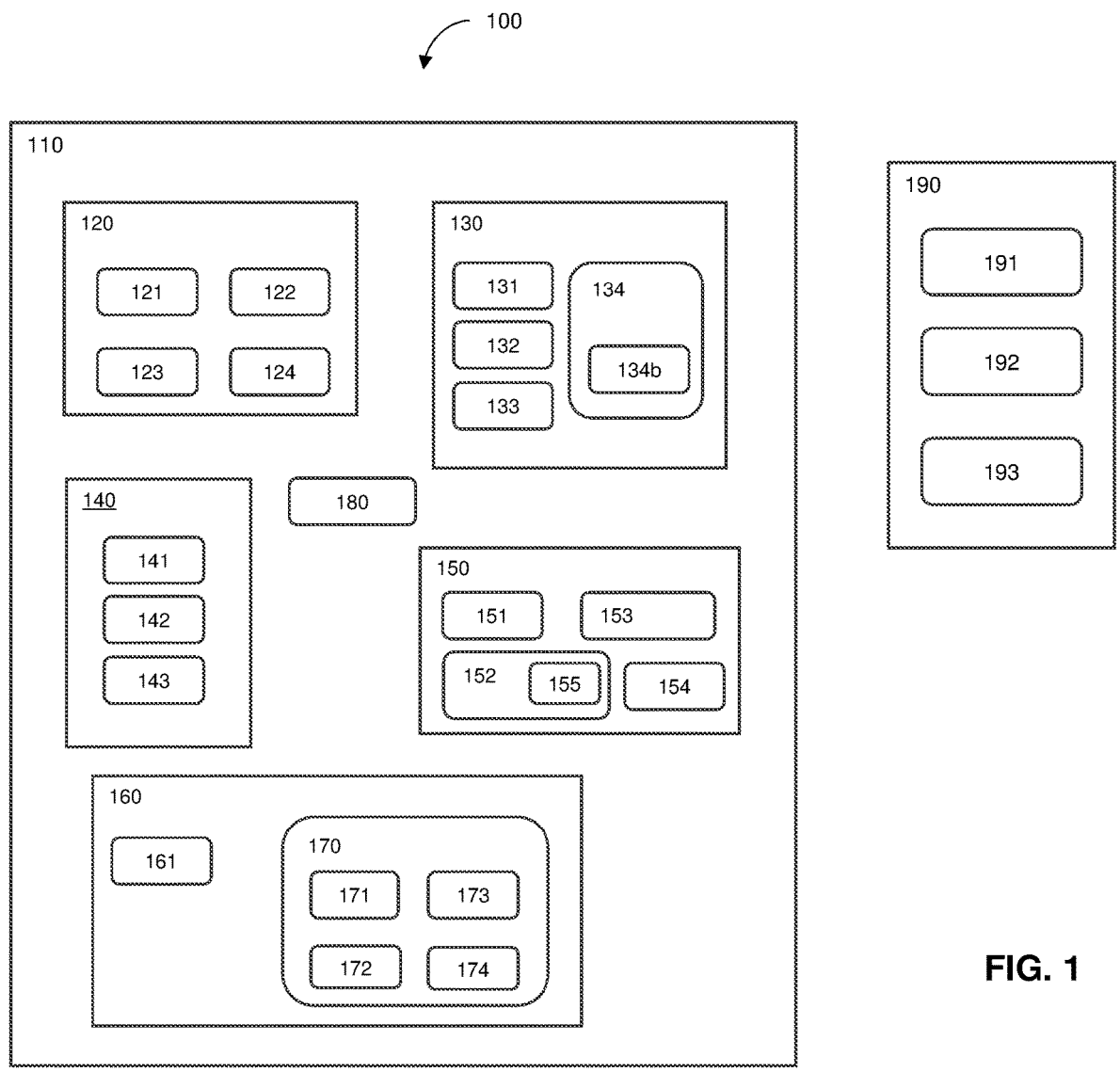
FIG. 1 shows a system for assetizing a revenue stream.

In the following detailed description, numerous specific details are set forth in order to provide a thorough understanding of some embodiments. However, it will be understood by persons of ordinary skill in the art that some embodiments may be practiced without these specific details. In other instances, well—known methods, procedures, components, units and/or circuits have not been described in detail so as not to obscure the discussion.

Discussions herein utilizing terms such as, for example, "processing," "computing," "calculating," "determining," "establishing," "analyzing," "checking," or the like, may refer to operation (s) and/or process (es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

References to "one embodiment," "an embodiment," "demonstrative embodiment," and "various embodiments" indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc. to describe a common object, merely indicate that different instances of like objects are being referred to, and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of microwave or Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory (RAM), read only memory (ROM), programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments are described herein with respect to a method. However, some embodiments may be implemented for example, by an apparatus, a device and/or a system including means for triggering, causing, controlling, and/or performing one or more, e.g., some or all, of the operations of the method. In one example, an apparatus, a device and/or a system may include one or more components, modules and/or units, for example, including circuitry and/or logic, configured to trigger, cause, control, and/or perform one or more, e.g., some or all, of the operations of the method.

The following describes various aspects of the present technology. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an," and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with an embodiment is included in at least one embodiment.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments described herein are merely exemplary, and should not be construed as limiting of the scope or spirit of the claims as appreciated by those of ordinary skill in the art. All statements herein reciting principles, aspects, and embodiments are intended to encompass both structural and functional equivalents thereof. Furthermore, to the extent that the terms "including", "includes", "having", "has", "with", or variants thereof are used in either the detailed description and the claims, such terms are intended to be inclusive in a similar manner to the term "comprising."

As used herein, a smart contract refers to a self-executing contract with the terms of an agreement between parties being directly written into lines of code. The code and the agreement contained therein exists across a distributed, decentralized network. The code controls the execution, and transactions are trackable and irreversible. One example of a distributed decentralized network is Ethereum blockchain. Ethereum is a decentralized, open-source blockchain with smart contract functionality. Ether is its native cryptocurrency.

A computer system herein is configured to convert a revenue stream to an asset (that is, "assetize" the revenue stream). For example, a party has a steady stream of revenue, and wishes to use that revenue stream to secure a loan. In accordance with some aspects and embodiments of the invention, a computer system herein can assetize the revenue stream. The assetized income stream can then be used to secure the loan.

A computer system herein is further configured to generate at least one smart contract on a distributed, decentralized network. The smart contract directs payments with respect to the revenue stream. For example, if the assetized revenue stream is used to secure a loan, a computer system herein may automatically make loan payments by drawing funds directly from the income stream and disbursing the funds to one or more lenders.

Referring to FIG. 1, a system 100 is shown that includes a back end system 110 and a front end system 190. The system 100 includes a processing unit and memory. In accordance with some aspects and embodiments of the invention, elements of the front end system 190 and the back end system 110 are implemented in code and stored in the memory and executed by the processing unit of the system 100. In accordance with some aspects and embodiments of the invention, elements of the front end system 190 and the back end system 110 are implemented in hardware and in communication with the memory and the processor unit of the system 100.

In accordance with some aspects and embodiments of the invention, the front end system 190 includes dashboards, such as lender dashboard 191, borrower dashboard 192, and admin dashboard 193. These dashboards 191, 192, 193 enable users to interface with the system 100, such as enabling a borrower to submit financial information about a revenue stream. The front end system 190 also allows the borrower to provide authorization to access the revenue stream by an integrating payment gateway 123, and accept terms of use. The front end system 190 also allows the lender to list, swap, buy, or sell their lending positions (i.e. their ownership of assetized revenue streams) (in the form of input that is communicated to the back end system 110) through the trading system 160, which can use a centralized infrastructure 161 and/or a decentralized infrastructure 170. The front end system 190 also includes an admin dashboard 193, which allows the administrator or user of the platform to edit client and company details, manually approve or ban loans, and provide manual input to the risk assessment system 141.

In accordance with some aspects and embodiments of the invention, the back end system 110 comprises a payment unit 120 that can access and control a future revenue stream, a lending unit 130 that provides funds from one or more lenders to a company in exchange for a (part of a) revenue stream, a data system 140 which collects data about a company and produces forecasts, metrics, and scoring/risk rating, a marketplace system 150, which allows lenders to transfer ownership of loans—with or w/o blockchain, allows lenders to constitute groups in relation to a specific company at a specific instance and matches lenders to companies. The marketplace system 150 acts as a smart contract. The back end system 110 includes a trading system 160 that allows lenders to trade, swap, list, and buy the assetized revenue streams they own.

In accordance with some aspects and embodiments of the invention, the payment unit 120 includes one or more modules that can access accounts receivable of a company (i.e. collect payments that are due to the company from its customers) OR collect money from the company itself. In accordance with some aspects and embodiments of the invention, the payment unit 120 includes a debt collection system 121 that collects debt owed to the company. In accordance with some aspects and embodiments of the invention, the payment unit 120 includes an invoicing system 122, which can issue invoices to the company such that by paying those invoices to the platform, the company provides the payment unit 120 with funds. In accordance with some aspects and embodiments of the invention, the payment unit 120 includes a payment gateway 123 that the company can integrate in their own infrastructure, website, platform etc.; such that the cost of goods and services provided by the company to its users can be paid by the users via the payment gateway 123, thus providing the payment unit 120 with access to this revenue stream. In accordance with some aspects and embodiments of the invention, the payment unit 120 includes a direct debit system 124 which can direct debit the customers of the company on behalf of the company, thus gaining access to the revenue stream generated by these funds.

The lending unit 130 includes of one or more modules that can provide a company with funds from one lender which can be the assetize platform or an external entity (such as an individual investor or an institutional investor); or funds from a group of lenders via the marketplace system 150. The lenders provide these funds to the company according to a contract, in exchange for assetized future revenue streams.

In accordance with some aspects and embodiments of the invention, the lending unit 130 can hold multiple contracts between a company and any number of lenders, which can be the same types or different types of contracts. For example, the same company may hold at the same time two fixed-term loan contract with a single lender, a revenue-based financing (RBF) contract with the same single lender, and an invoice-based financing contract with a queue of lenders. In accordance with some aspects and embodiments of the invention, the lending unit 130 includes a fixed-term loan processor, by which means the lender provides funds to the company, and the company is to pay according to a defined loan schedule. The funds (or a part thereof) for repaying the lender can be collected by the payment unit 120 automatically or can be paid by the company to the platform via the invoicing system 122.

In accordance with some aspects and embodiments of the invention, the lending unit 130 includes a revenue-based financing (RBF) module, which provides the company with funds that must be paid back not according to a fixed loan schedule, instead with a specific percentage of the revenues of the company.

In accordance with some aspects and embodiments of the invention, the lending unit 130 includes a direct supplier payment processor 133, that provides funds from the lenders to the company not in the form of liquid assets (e.g. cash) but in the form of paying the suppliers/vendors of the company on behalf of the company.

In accordance with some aspects and embodiments of the invention, the lending unit 130 includes an invoice-based financing processor 134, which allows lenders to pay the company in advance the annualized value of a recurring invoice (such as a monthly subscription) at a discount 0-100%, in exchange for ownership of the future revenue generated through that invoice.

In accordance with some aspects and embodiments of the invention, the invoice-based financing processor 134 includes a user payment option system 134b that decides whether the invoice-based financing processor will be used or not for a specific recurring invoice, by displaying a selectable payment option to the company's users which, when selected by the company's users, essentially creates a contract directly between the company's users and the lenders. In accordance with some aspects and embodiments of the invention, the contract can be between company's user and lender. In accordance with some aspects and embodiments of the invention, the contract can be between the company's user and company. In accordance with some aspects and embodiments of the invention, the contract is between the company's user to company to lenders.

In accordance with some aspects and embodiments of the invention, the back end system 110 includes application programming interface (API) modules for integrating with other system or services, such as financial services. In accordance with some aspects and embodiments of the invention, the back end system 110 includes a data system 140. In accordance with some aspects and embodiments of the invention, the data system 140 includes a scoring system or risk assessment system 141 with an API for integration. The risk assessment system 141 uses data collected by a data collection module 142 and the inference and/or forecasts generated by a machine learning (ML) module 143 in order to compute one or more overall risk scores of the company. After the scoring has been performed, the score is used to generate certain terms of a contract or certain constraints on the values of the terms of contract or certain recommendations that are displayed to the lenders. For example, due to a bad score, the borrower may be constrained to propose to lenders a contract with a desired interest rate in a specific range. Further, due to a bad score, the borrower may be constrained to accept a number of additional clauses to the contract, such as pledging specific assets of the company in the event of a default or accepting a specific loan seniority level. As an alternative non-limiting example, due to a good score, a notice may be displayed to the lenders to recommend bidding in a certain range of lower interest rate range. After the scoring has been performed, the score is used to generate certain terms of a contract.

In accordance with some aspects and embodiments of the invention, the data system 140 includes a data collection module 142 with an API for integrating with financial services. The API of the data collection module 142 allows the system 100 to access a revenue stream. The API of the data collection module 142 integrates with a user's financial, accounting, and management services to obtain historical information about the revenue stream, such as accounting, billing, customer relationship management (CRM) data, banking transactions, financial statements. In accordance with some aspects and embodiments of the invention, the API of the system 142 can also take manual input, in the form of a file upload and/or answers to forms/questionnaires, and manual input from the risk management team. The API of the system 142 can also connect to private or public services to further interrogate databases with data about the company (barrower) and/or data not specifically related to the company, such as on the state of the global or national economy.

In accordance with some aspects and embodiments of the invention, the data system 140 includes the ML module 143 for analyzing the financial information. For example, the ML module 143 is trained to process the financial information to generate a score for the revenue stream or forecast the future values of the financial data. Depending on the training, the score may indicate different aspects, such as financial health relative to similar companies, and risk assessments and guidelines on investments to investors and borrowers. If there are top-tier venture capital firms that provide financial backing, there is a de-risk component. In accordance with some aspects and embodiments of the invention, the ML module 143 might be trained for a particular industry. Therefore, the back end system 110 might store multiple trained ML models, and apply the appropriate model to a company generating the revenue stream. In accordance with some aspects and embodiments of the invention, the system 110 store only a single ML model in the ML module 143 that is applicable across several industries.

In accordance with some aspects and embodiments of the invention, the ML module 143 may be trained on the historical accounting data, billing data, metrics and analytics, and CRM data associated with a revenue stream. The training determines the relative weights of the ML module 143. Accounting and billing data includes, without limitation, due diligence, corporate profits, financials, business performance and governance, and outlook. Tools for providing metrics and analytics are available from Google analytics, Userpilot, Heap, NapoleonCat, smart karrot, and ProfitWell. Examples of CRMs include activecampaign, HubSpot, and Zoho. Data of interest includes churn rate, activation rate, MRR (monthly recurring revenue), CLV (customer lifetime value), renewal rate, revenue retention, and MRR growth rate.

The training may be based on historical data at both a macro-level and a micro-level. An example of micro-level data is credit card data. For instance, credit card data repeats on average 4.7 times a week in a restaurant with an average basket of $20 US dollars (USD) for the past seven months. As an example of macro-level data, a restaurant has had for last three years, 87% full capacity rate, with an average basket of $26.5 USD. As another example of macro-level data, a music streaming service has users paying a monthly fee of $10 USD per month. Of that fee, the streaming service keeps $3 USD.

In accordance with some aspects and embodiments of the invention, the data system 140 performs its operation continuously, such that whenever a company's parameters change, the change is picked up by the system 142, it is reflected in the results of the ML module 143, and risk assessment provided by the system 141 is updated accordingly. Continuous processing by the data system 140 allows real-time changes to the revenue stream to be detected and the revenue stream can be rescored. If the new score indicates an improved outlook for the revenue stream, the assetized value of the revenue stream may be increased, and the smart contract may be automatically adjusted in accordance with the increased assetized value, through inputs received from software intermediaries of new additional data.

The APIs allow the system 100 to access a client's, barrower's, or user's revenue stream. For instance, the APIs allow the system 100 to withdraw funds from the revenue stream. The APIs also integrate with the user's financial services to obtain historical information about the revenue stream, such as accounting, billing and customer relationship management (CRM) data. In accordance with some aspects and embodiments of the invention, the APIs interface with the payment units or payment gateways, data systems, marketplace systems, trading systems, and lending systems.

In accordance with some aspects and embodiments of the invention, the system 110 includes a smart contract factory or a marketplace system 150. The marketplace system 150 provides a method of matching one or multiple lenders to a single company. The marketplace system 150 includes a company-to-lender matching module 153. The marketplace system 150 includes a pool lending module 151 and an auction module 154 and one or more modules that allow multiple lenders to act as one in relation to a contract with a company. As noted, the waiting queue 154 enables future payees to be automatically added, thereby further increasing processing speed and further reducing network traffic.

The marketplace system 150 includes a payee queue, which is discussed below. Each entry in the payee queue identifies a party that will be paid under the terms of the smart contract. The smart contract incorporates payees to the queue. In some embodiments, the payee queue includes a first-in, first-out buffer.

The matching module 153 matches the parameters of the company (such as: the name, the sector/industry, the company size, the market capitalization, and other data about the company; including data collected by the data collection system 142, the inferenced metrics and forecasts predicted by machine learning module 143, and the risk assessment provided by system 141) with the preferred parameters/investment thesis of the lenders, which they can provide via the lender dashboard 191.

In accordance with some aspects and embodiments of the invention, based on this matching, the matching module 153 can automatically match lenders with borrowers and close the contract between them (provided both parties have expressed their willingness to automatically close contracts on their behalf) and/or it can recommend borrowers and lenders to each other or alter the sorting of the borrowers and lenders in the lender dashboard 191 and the borrower dashboard 192 according to the preferences of the user that views the dashboard.

In accordance with some aspects and embodiments of the invention, the marketplace system 150 includes a pool lending module 151 that allows at least two lenders to pool their funds together and close a contract via the lending unit 130 with a company as if they were a single entity. Consequently, each lender has ownership over a percentage of the future revenue stream defined by the contract, such that the percentage is proportional to the percentage of funds contributed to the pool.

In accordance with some aspects and embodiments of the invention, the marketplace system 150 includes an auction module 154 that generates the pool via the pool lending module 151 or a queue via the queue lending module 152 out of a list of candidate lenders through an auction mechanism.

For example, lenders can bid with their preferred interest rate on a contract with a specific company, and the auction module 154 will select lenders from lowest to highest interest rate such that the combined funds cover the loan amount requested by the company as part of the contract.

In accordance with some aspects and embodiments of the invention, the marketplace system 150 includes a queueing module 152 that allows at least two lenders to constitute a payee waiting queue 155, such that they provide funds to the company and receive paybacks from future revenue streams according to the payees in the waiting queue 155. In accordance with some aspects and embodiments of the invention, in a queue with two lenders and when using invoice-based financing processor 134, as the company invoices its users, the first lender in the queue will have to pay the discounted annualized value of invoices to the company and in turn will receive ownership of the revenue stream generated by those invoices, but once the first lender's fund allocation to that queue runs out, subsequent invoices are directed to the second lender in the queue. The queueing module 152 thus includes the waiting queue 155, which holds all lenders that have a greater than zero fund allocation to the queue, but have not yet been awarded an invoice. In accordance with some aspects and embodiments of the invention, the waiting queue 155 enables future payees to be automatically added, thereby further increasing processing speed and further reducing network traffic.

The queueing module 152 offers additional advantages. The queueing module 152 enables new payees to be automatically added, and matured payees to be automatically removed. In conjunction with the ML module 143 and the matching module 153, terms of a contract can be automatically updated, through information collected from software intermediaries.

In accordance with some aspects and embodiments of the invention, the system 110 includes a trading system 160, which allows lenders to trade, swap, list for sale, or buy positions from each other. In accordance with some aspects and embodiments of the invention, the term "position" means that the ownership of a future revenue stream or part thereof, in a contract between the lender as a unitary entity with a company or one or more of the company's clients, or in a contract between the lender as part of a group (such as a pool via the pool lending module 151 or a queue via the queue lending module 152) with a company or one or more of the company's clients.

In accordance with some aspects and embodiments of the invention, the trading system 160 includes a centralized trading module 161, which relies on a centralized trading infrastructure. In accordance with some aspects and embodiments of the invention, the trading system 160 includes a decentralized trading module 170 using a decentralized trading infrastructure. In accordance with some aspects and embodiments of the invention, the trading system 160 uses a mix of both. The trading infrastructure is responsible for storing the orders and orderbook (including buy/sell orders, auctions, and more) and for settling the transactions.

In accordance with some aspects and embodiments of the invention, the decentralized trading module 170 includes a position smart contract 171 responsible for storing the ownership lenders have on their positions. Furthermore, the position smart contract 171 stores the ownership in the form of digital tokens (e.g. NFTs), such that each digital token is mapped to the lender who owns the asset represented by the digital token. In accordance with some aspects and embodiments of the invention, the mapping may be as part of the decentralized module 170 and/or part of the centralized module 161. In accordance with some aspects and embodiments of the invention, the decentralized module 170 includes a decentralized position trading platform 172, which can be used for settling position transactions between lenders. In accordance with some aspects and embodiments of the invention, the decentralized trading module 170 includes an optional decentralized payment unit 173, which has the same responsibilities and components as the payment unit 120 except that it is hosted on a decentralized platform (such as the Ethereum blockchain).

In accordance with some aspects and embodiments of the invention, the decentralized trading module 170 includes an optional decentralized lending unit 174, which has the same responsibilities and components as the lending unit 130, except that it is hosted on a decentralized platform (such as the Ethereum blockchain).

In accordance with some aspects and embodiments of the invention, the position smart contract 171 may be further configured to generate digital tokens for parties to a smart contract. One example of a digital token is a non-fungible token (NFT). For instance, if the position smart contract 171 specifies a loan, the digital token provides proof of a lender's investment. The digital token may represent a lender's investment share and may store the legal loan agreement document in its metadata, as well as the key terms and parameters of the loan. After a loan is paid off, the digital token becomes void.

The system 100 is not limited to any particular type of business arrangement, but is useful for facilitating loans. A loan may be personal or commercial, secured or unsecured. A loan may be between a single financial institution and one individual, or multiple lenders and borrowers. In accordance with some aspects and embodiments of the invention, the system 100 is particularly useful to facilitate a large loan by aggregating a large number of small investments.

The back end system 110 further includes the payment unit 120 that directly accesses the revenue stream via the APIs and can take funds out of the revenue stream. In accordance with some aspects and embodiments of the invention, a cryptocurrency conversion module converts money (that is, government-issued currency) into stablecoins, and the back end system 110 can disburse those funds to the payees in the payee queue pursuant to the terms of a smart contract.

In accordance with some aspects and embodiments of the invention, the system 100 includes crypto wallets, such as a borrower crypto wallet and a lender crypto wallet, along with the cryptocurrency conversion module. If an investment with fiat money is made under the terms of the smart contract, the fiat money may be placed in a safeguarding account (not shown). A conversion module converts that money to the stablecoin cryptocurrency (e.g., ERC20, USDT, USDC, Dai), which is stored in the lender crypto wallet. Similarly, funds taken from the revenue stream can be converted into cryptocurrency and storied in the borrower crypto wallet. Some configurations of the system 100 may also include a "know your customer" (KYC) verification module 180.

Processing time is reduced substantially. Each transfer using cryptocurrencies and blockchains takes a few seconds, whereas the transfer of fiat money can take hours if not days. While the fiat money is in safeguarding account, the cryptocurrency can change wallets multiple times without the fiat currency leaving the safeguarding account.

In accordance with some aspects and embodiments of the invention, the smart contract factory or marketplace system 150 may be further configured to generate digital tokens for parties to a smart contract. One example of a digital token is a non-fungible token (NFT). For instance, if the smart contract specifies a loan, the digital token provides proof of a lender's investment. The digital token may represent a lender's investment share and may store the legal loan agreement document in its metadata, as well as the key terms and parameters of the loan. After a loan is paid off, the digital token becomes void.

The system 100 is not limited to any particular type of business arrangement, but is useful for facilitating loans. A loan may be personal or commercial, secured or unsecured. A loan may be between a single financial institution and one individual, or multiple lenders and borrowers. However, the system 100 is particularly useful to facilitate a large loan by aggregating a large number of small investments.

FIGS. 2-6 illustrate an example of using the system 100 to assetize the revenue. In this example, there is one borrower and multiple lenders, as no single lender is willing to incur the risk of funding the entire loan. As will be seen, the system 100 enables the loan process to be streamlined.

Figure 2:
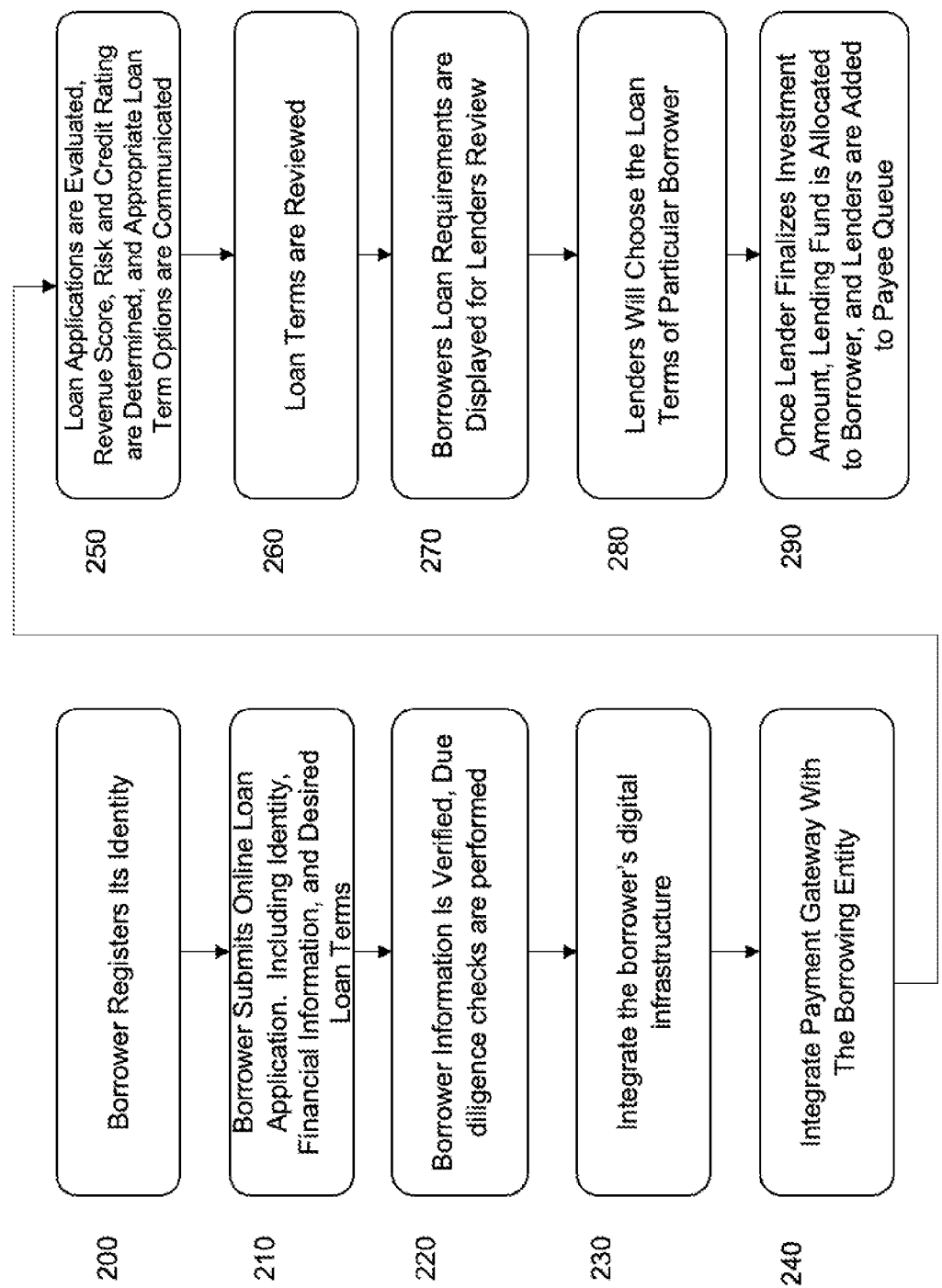
FIGS. 2-6 show processes for assetizing a revenue stream using the system of FIG. 1.

Reference is now made to FIG. 2. At step 200, a borrower registers as an entity with the system 100 using the borrower dashboard 192. Registration information could include basic details and contact information of the borrower.

At step 210, the borrower submits an online loan application via the borrower dashboard 192. The loan application might request the identity of the borrower and borrowing entity, financial information and desired loan terms. Desired loan terms might include currency, amount of loan, preferred interest rate (set as a range), loan duration, and payment schedule. The online loan application also requests the borrower to identify a revenue stream and information associated with the revenue stream. The type of information is of the type used by the data system 140.

At step 220, the borrower information is verified, Due Diligence checks are performed using the KYC verification module 180.

At step 230, the borrower provides information that allows the APIs 142 to integrate the borrower's digital infrastructure (e.g., borrower website, banking software, accounting software, subscription management software, CRM software) with the back end system 110.

At step 240, the payment unit 120 is integrated with the borrowing entity. This will help to monitor the financial information of the borrowing entity and to process the payments.

At step 250, the loan application is evaluated, and risk and credit rating are determined, and loan term options are communicated to the borrower. In addition, the data system 140 processes the financial information to score the revenue stream. The application may be reviewed by one or more people, and/or it may be reviewed by artificial intelligence. During the review, an interest rate bracket will be communicated to the borrower. Opting for a higher interest rate by the borrower may improve chances of raising the funds, although approval might not be guaranteed.

At step 260, the borrower then reviews the loan terms provided by the system 100 and submits his or her desired loan terms. The borrower's desired interest rate will then be used in the agreement.

At step 270, the borrower's loan terms are displayed via the borrower dashboard 192 to any potential lenders who have previously registered with the system 110.

At step 280, any lender who is interested in funding the loan and who agrees with the terms of the borrower, can inform the borrower of their interest via the lender dashboard 191. Each candidate lender may indicate the amount they would like to invest.

At step 290, once a lender finalizes an investment amount, a lending fund is allocated to the borrower. That lender is added to the payee queue 152. The lender deposits funds in a safeguarding account.

Figure 3A:
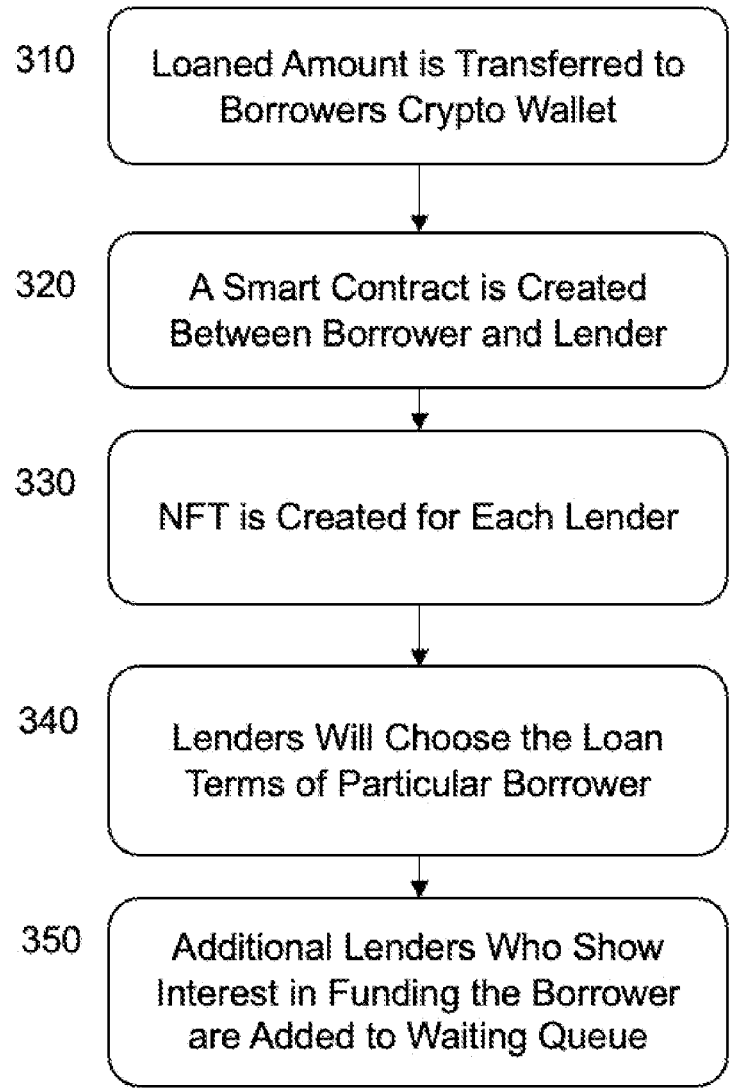

Reference is now made to FIG. 3A. At step 310, loaned funds are transferred to the borrower. Each lender will transfer their agreed loaned amount in stablecoin cryptocurrency from their crypto wallet to the borrower crypto wallet. This transaction is added to the blockchain.

At step 320, the marketplace system 150 creates at least one smart contract, where the contract terms are coded into the blockchain. There may be one smart contract created for each selected lender, or a contract that covers multiple selected lenders.

At step 330, the marketplace system 150 mints a non-fungible token (NFT) for each selected lender. At step 340, NFT are sent to their respective lender crypto wallets.

At step 350, additional lenders who show interest in funding the borrower are added to the waiting queue 154 for any new loan requirements from the borrower.

Figure 3B:
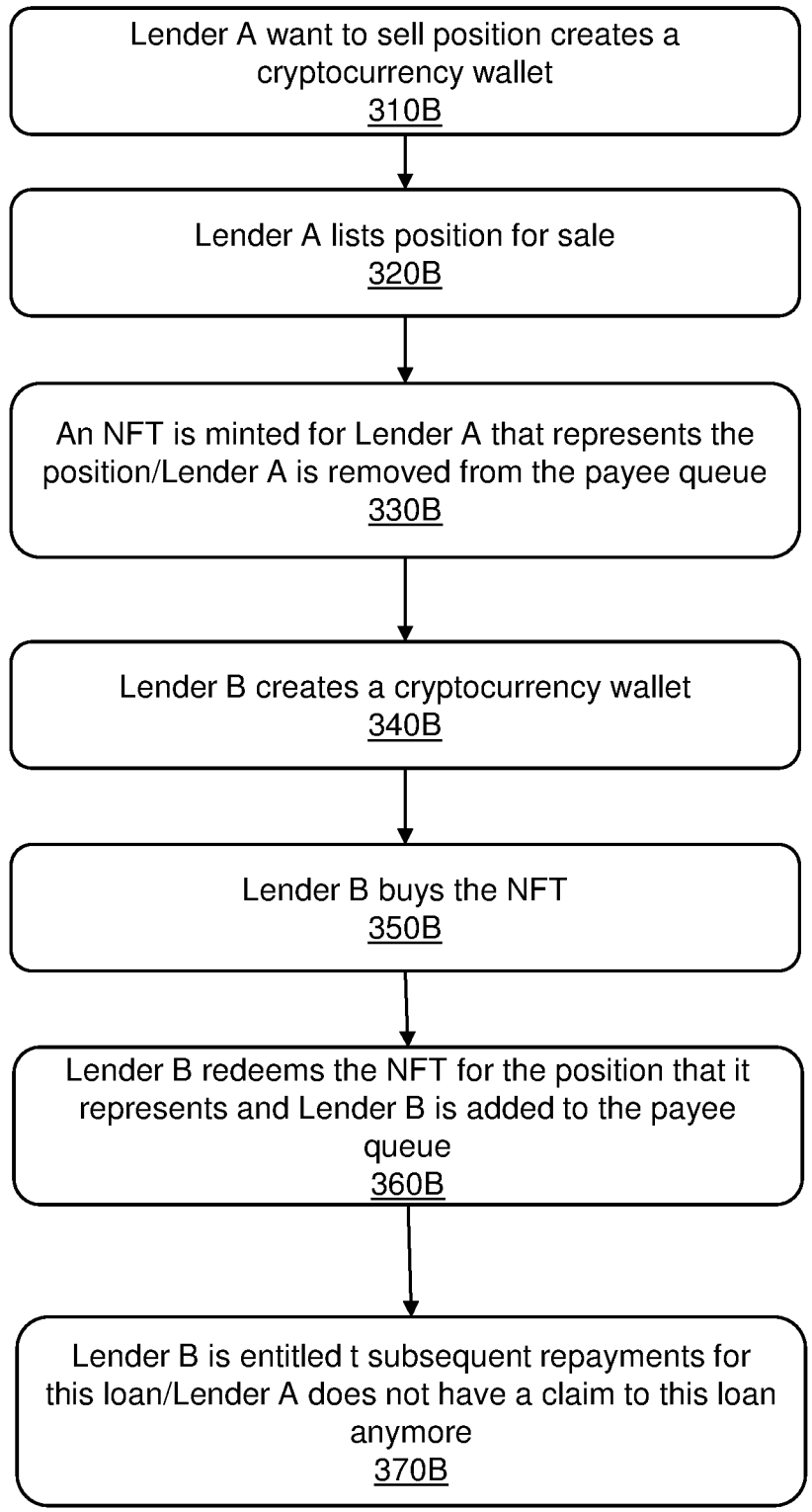

Reference is now made to FIG. 3B. At step 310B, lender A who owns a portion of a loan and wants to sell his position, creates a cryptocurrency wallet. At step 320B, lender A lists their position for sale on the marketplace and at step 330B a NFT is minted to lender A's wallet, which represents the position and is listed for sale in the decentralized position trading platform 172. At the same time, lender A is removed from the payee queue at the queue lending module 152.

At step 340B, lender B who wants to buy said position creates a cryptocurrency wallet. At step 350B, lender B buys the NFT off the decentralized position trading platform 172. At step 360B, lender B redeems the NFT on Assetize. The NFT is voided, and lender B is added to the payee queue. At step 370B, lender B is now entitled to all subsequent repayments for that loan, lender A does not have a claim to that loan anymore.

Thus, the loan process is streamlined. The revenue stream is assetized quickly, with little or no delay. Loan funds are identified quickly, with little or no delay. Moreover, the system 100 enables a large loan to be generated by a large number of small investments. As a result, risk associated with a large loan can be spread out over a number of small investors.

Figure 4A:
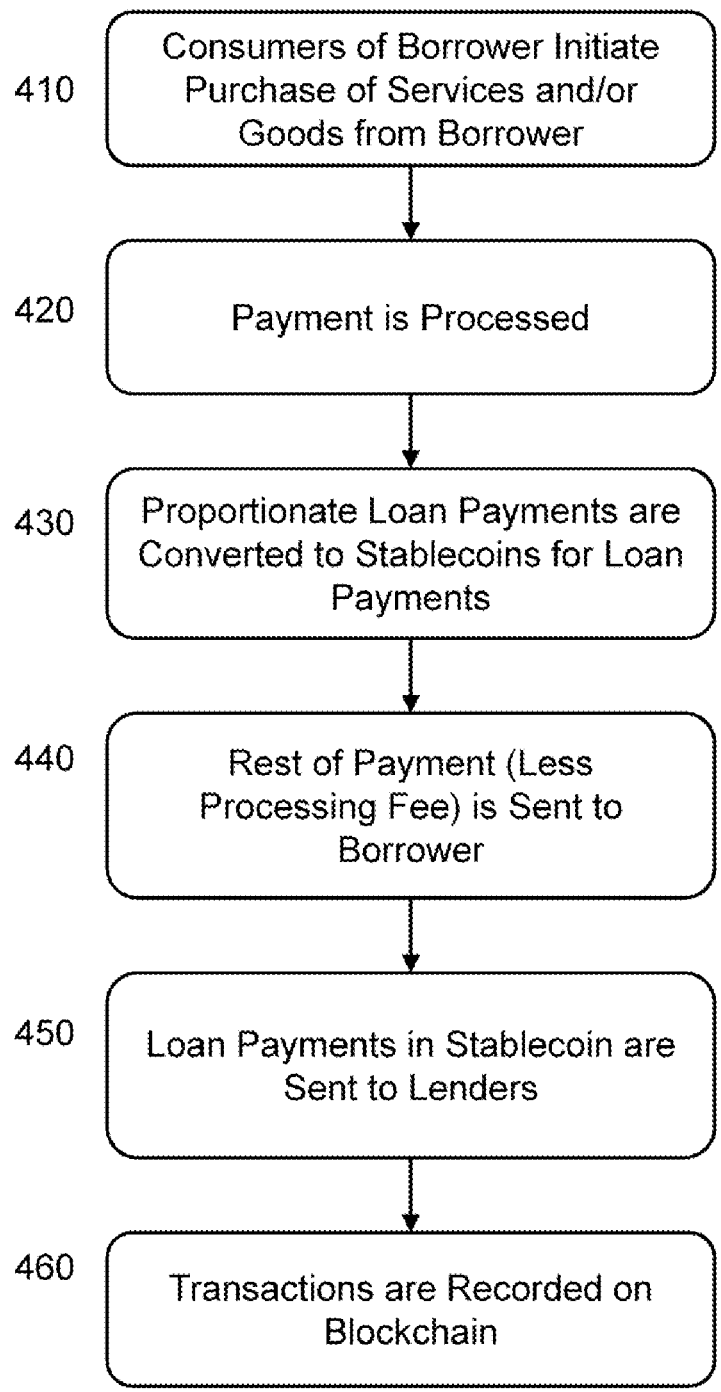

Reference is now made to FIG. 4A, which illustrates an example of steps for repayment of the loan. At step 410, money is added to the revenue stream. For example, a customer of the borrower purchases goods and/or services from the borrower.

At steps 420, 430 and 440, the payment gateway 123, via an API, processes the payment by retaining a sum for the loan payment, converting the sum to stablecoins, and forwarding the rest, excluding platform fees, to the borrower. For example, a monthly loan payment of $50 is due, and a consumer purchases $200 worth of the borrower's goods, and a processing fee is $2. The sum of $50 is retained for the loan payment, converted to an equivalent amount of stablecoins, and paid to the lender(s), while and the sum of $148, (after the processing fee is deducted) is forwarded to the borrower's bank account. Another purchase of $100 is made while the payment due is $0, so the payment gateway 170 forwards $99 to the borrower's bank account and retains a processing fee of $1.

At step 450, loan payments in stable coins are sent to the lenders. Proceeds are distributed among lenders to their respective crypto wallets.

At step 460, the transaction is recorded on blockchain. For instance, the transaction is broadcast to all computers participating in the specific blockchain network. The transaction is verified and stored into a block, and the block is added to the blockchain. The smart contract knows the amount and date of the loan payment.

Figure 4B:
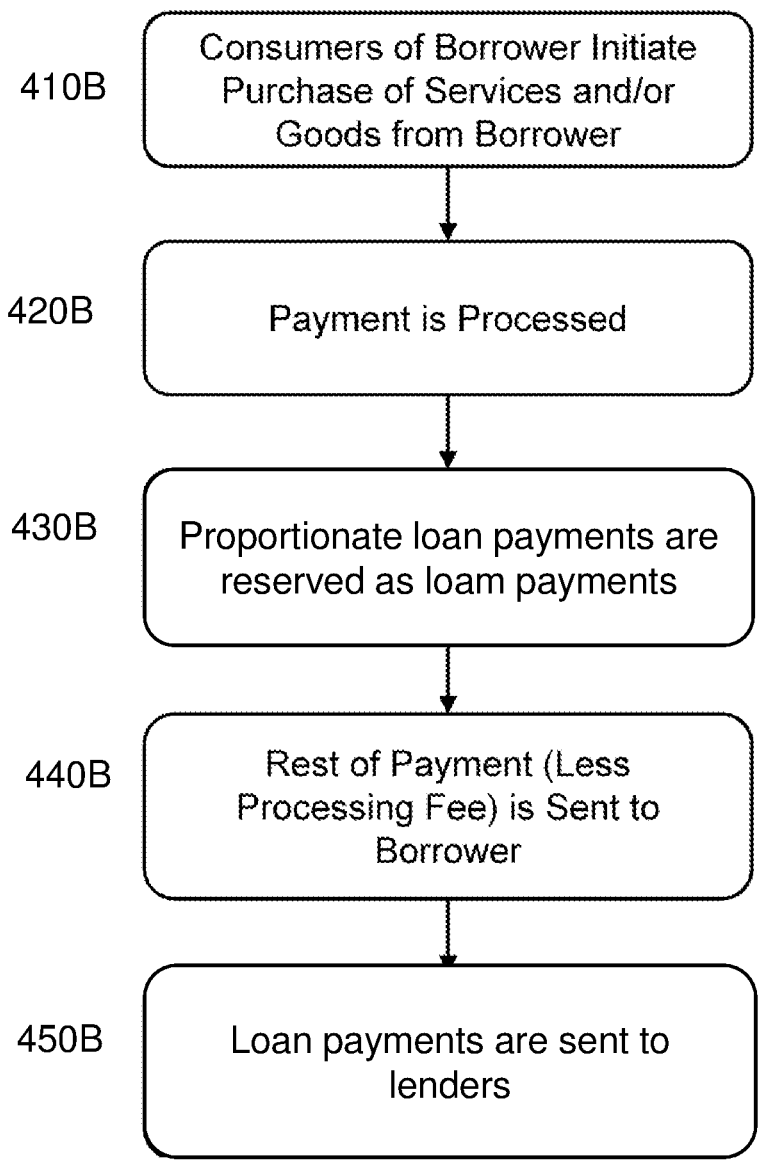

Reference is now made to FIG. 4B, which illustrates an example of steps for repayment of the loan. At step 410B, money is added to the revenue stream. For example, a customer of the borrower purchases goods and/or services from the borrower.

At steps 420B, 430B, and 440B, the payment gateway 123, processes the payment by retaining a sum for the loan payment, and forwarding the rest, excluding platform fees, to the borrower. For example, a monthly loan payment of $50 is due, and a consumer purchases $200 worth of the borrower's goods, and a processing fee is $2. The sum of $50 is retained for the loan payment, converted to an equivalent amount of stablecoins, and paid to the lender(s), while and the sum of $148, (after the processing fee is deducted) is forwarded to the borrower's bank account. Another purchase of $100 is made while the payment due is $0, so the payment gateway 123 forwards $99 to the borrower's bank account and retains a processing fee of $1. At step 450B, loan payments are sent to the lenders. Proceeds are distributed among lenders to their respective balances.

Figure 5A:
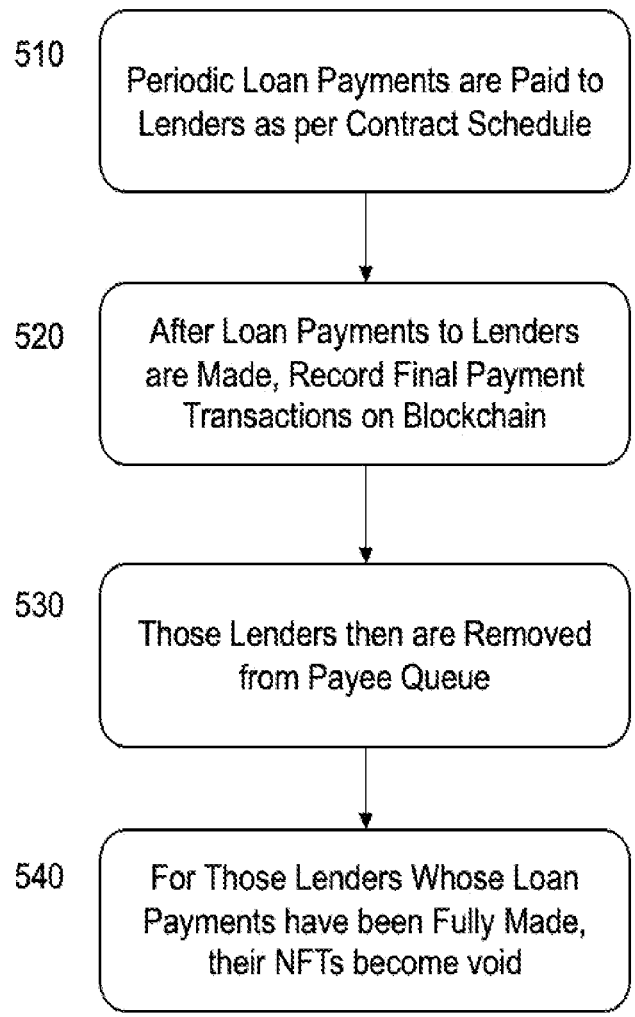

Reference is now made to FIG. 5A, which illustrates the steps for terminating a loan. At step 510, periodic loan payments are made to the lenders as per contract schedule. At step 520, after all the loan payment proceeds have been paid. or some other action has satisfied or discharged the loan obligation, final payment transactions are recorded on the blockchain. At step 530, those lenders are then removed from payee queue. At step 540 the NFTs of those lenders are made void.

Figure 5B:
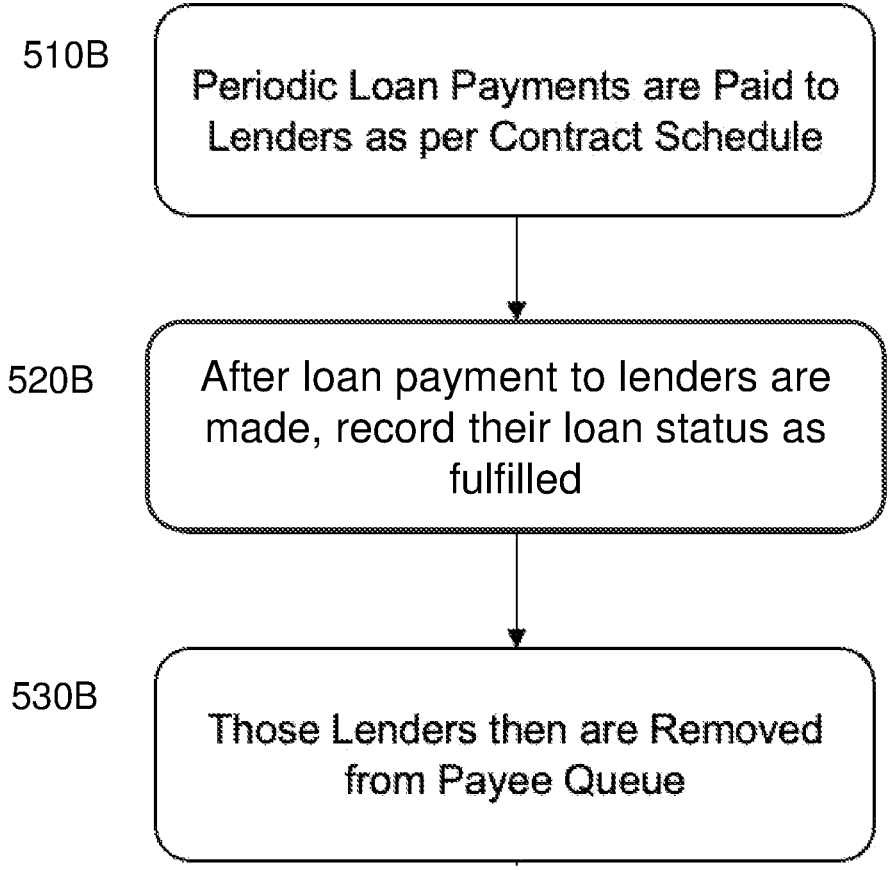

Reference is now made to FIG. 5B, which illustrates the steps for terminating a loan. At step 510B, periodic loan payments are made to the lenders as per contract schedule. At step 520B, after all the loan payment proceeds have been paid or some other action has satisfied or discharged the loan obligation, final payment transactions are recorded. At step 530B, those lenders are then removed from payee queue of the module 152.

Figure 6A:
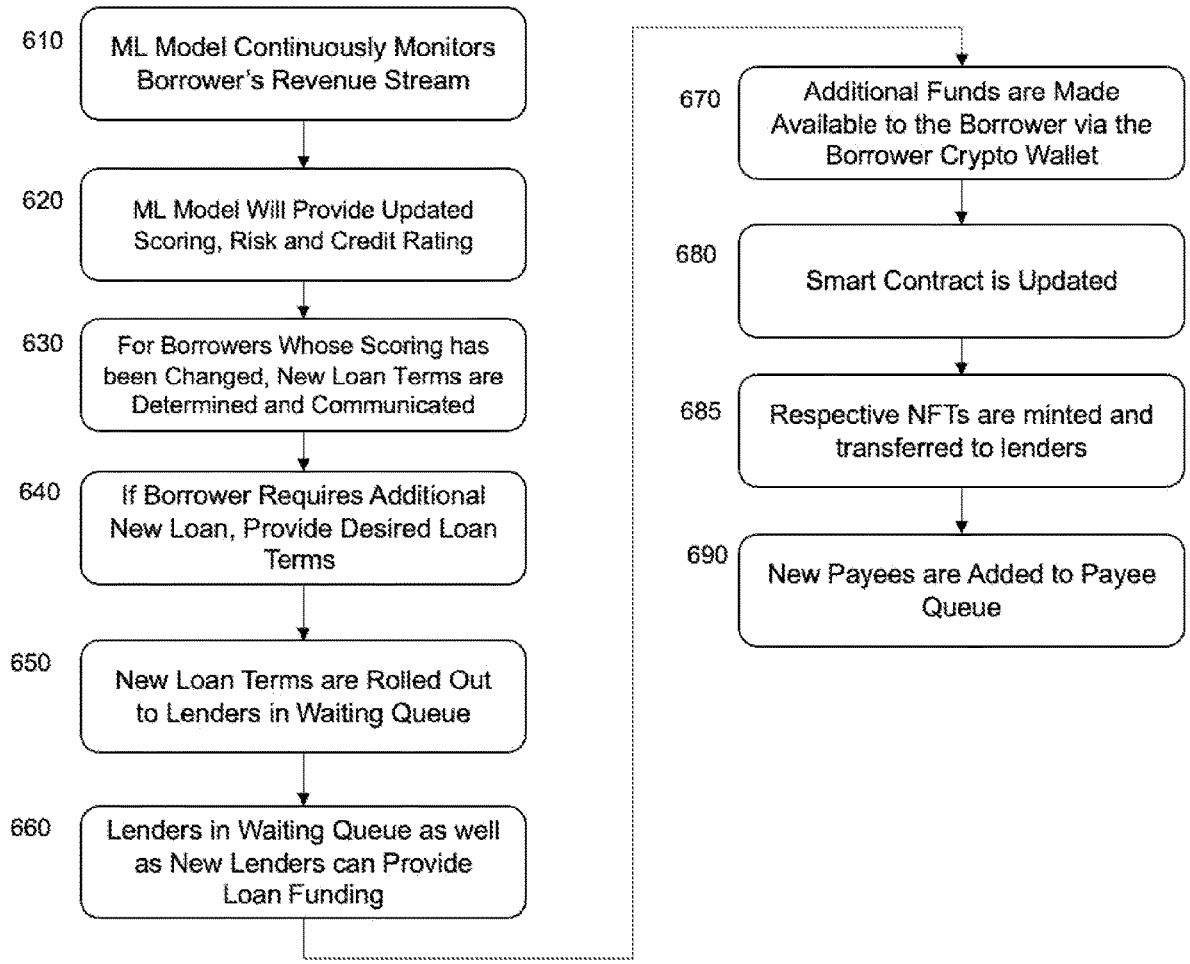

Reference is now made to FIG. 6A, which illustrates the steps for increasing loan funds. At step 610, the ML model is continuously monitoring the borrower's revenue stream. At step 620, the ML model provides an updated scoring, risk and credit rating. For instance, the ML model generates a series of scores indicating that the borrower's financial conditions have improved over time, the revenue stream has increased, and the revenue stream can now support additional funding.

At step 630 for a borrower whose scoring been changed, new loan terms are determined and communicated to the borrower for any additional new loan. For instance, a determination is made that the loan amount may be increased as supported by the higher revenue stream. If the increase is approved, the borrower is notified.

At step 640, if the borrower desires an additional new loan, he can provide desired loan terms. At step 650 the desired loan terms are rolled out to those lenders in the waiting queue 154 and any new lenders. At step 660, the lenders in waiting queue 154 as well as new lenders can agree to provide loan funding to the borrower if the new loan terms are acceptable. At step 670, the additional funds are made available to the borrower via the borrower crypto wallet.

At step 680, the smart contract is updated to accommodate the terms of new loan contract and at step 685 respective NFTs are minted and transferred to the lenders. At step 690, new payees been added to payee queue 152.

Consider the example where the borrower's score has improved and is now able to raise an extra $100K with 1% decreased interest rate compared to previous lending terms. The new information is communicated to borrower, who can provide his desired loan terms and amount to be raised for lender review. The lenders in the waiting queue 154 and/or new lenders who find the terms of loan acceptable can provide the loan funds by entering into an agreement or agreements. The new lending terms are incorporated in one or more smart contracts for the new lenders, and those new lenders are added to the payee queue 152.

Figure 6B:
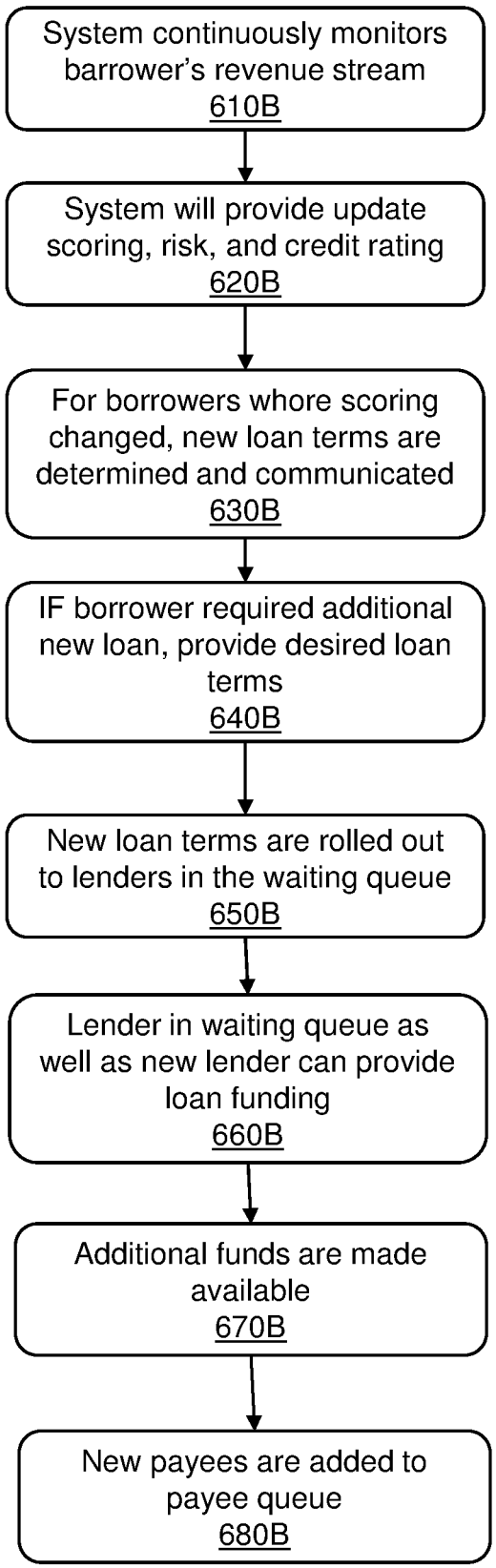

Reference is now made to FIG. 6B, which illustrates the steps for increasing loan funds. At step 610B, in accordance with some aspects and embodiments of the invention, the data system 140 is continuously monitoring the borrower's revenue stream. At step 620B, the data system 140 provides an updated scoring, risk and credit rating. For instance, the data system 140 generates a series of scores indicating that the borrower's financial conditions have improved over time, the revenue stream has increased, and the revenue stream can now support additional funding.

At step 630B for a borrower whose scoring been changed, new loan terms are determined and communicated to the borrower for any additional new loan. For instance, a determination is made that the loan amount may be increased as supported by the higher revenue stream. If the increase is approved, the borrower is notified.

At step 640B, if the borrower desires an additional new loan, he can provide desired loan terms. At step 650B the desired loan terms are rolled out to those lenders in the waiting queue 154 and any new lenders. At step 660B, the lenders in waiting queue 154 as well as new lenders can agree to provide loan funding to the borrower if the new loan terms are acceptable. At step 670B, the additional funds are made available to the borrower. At step 680B, new payees been added to payee queue 152.

Consider the example where the borrower's score has improved and is now able to raise an extra $100K with 1% decreased interest rate compared to previous lending terms. The new information is communicated to borrower, who can provide his desired loan terms and amount to be raised for lender review. The lenders in the waiting queue 154 and/or new lenders who find the terms of loan acceptable can provide the loan funds by entering into an agreement or agreements. The new lending terms are incorporated in one or more smart contracts for the new lenders, and those new lenders are added to the waiting queue 154.

The system 100 streamlines the increase in funding. There is no need for the borrower to apply for a new loan to get the additional funding, nor is there a need to find new lenders. Steps are performed automatically in real time. And because another loan application is not required, and resources are not spent processing the new loan application, burdens on memory, network bandwidth and computational resources of the system 100 are reduced.

In accordance with the various aspects and embodiments of the invention, the system includes a payment unit and a lending unit. The payment unit controls the revenue, which may be accounts receivable funds or any form of revenue.

The lending unit provides a means for lender to extend funds to barrowers (company or individual or small business) in exchange for control of the revenue or in exchange for a portion of one or more future revenue streams. In accordance with the various aspects and embodiments of the invention, the system includes the payment unit having a debt collection system, or a payment gateway, or a system that can direct debit from the borrower (or the clients' payments to the borrower. In accordance with the various aspects and embodiments of the invention, the payment unit has the capability of invoicing the company directly, to compensate or replace the funds collected from the future revenue streams. In accordance with the various aspects and embodiments of the invention, the lender is the platform or controls the system.

In accordance with the various aspects and embodiments of the invention, the system includes at least one lender that is an individual or institutional lender external to the system or platform (i.e. is not the platform itself; instead, has an account with the platform). In accordance with the various aspects and embodiments of the invention, at least one lender can view the companies available to lend to, and/or can configure his lending preferences or criteria.

In accordance with some aspects and embodiments of the invention, the system where the funds provided by the lending unit to the company are in the form of a fixed-term loan that the company must pay back to participating lenders according to a loan payment schedule, such that the payments are covered partly or wholly by the company's accounts receivable via the payment unit In accordance with some aspects and embodiments of the invention, the funds provided by the lending unit to the company are in the form of revenue-based financing, which the company must pay back via a percentage of the company's future revenues, such that the payments are covered by the company's accounts receivable via the payment unit In accordance with some aspects and embodiments of the invention, the system where the funds provided by the lending unit to the company are in the form of invoice-based financing, such that at least one lender provides the company an agreed annual value of an invoice in exchange for full access to the future payments on that invoice.

In accordance with some aspects and embodiments of the invention, the system where the funds provided by the lending unit to the company are in the form of invoice-based financing, such that the IBF pipeline is presented by the company to their users as one payment option, perhaps in addition to other payment options such as "billed monthly" and "billed annually with a discount"

In accordance with some aspects and embodiments of the invention, the system where the funds provided by the lending unit to the company are in the form of direct payments to the company's suppliers or creditors, such that the lenders recoup the funds via the payment unit.

In accordance with some aspects and embodiments of the invention, the system with the addition of a data system that provides a risk assessment of the company, (to aid the lenders' manual decision-making process regarding whether to lend money to the company and/or regarding the parameters of the loan (such as: interest rate, revenue percentage, maximum term, etc.)) and/or in order to automatically trigger the lending or an algorithmic computation of the loan parameters based on the lenders' configured lending preferences or criteria.

In accordance with some aspects and embodiments of the invention, wherein the data used by the data system is either of or combination of (but not limited to) the following: accounting data, revenue history, billing data, banking transactions, CRM data, financial statements, custom questionnaires, global economy data, data collected by any of the systems part of this patent (including the "payment unit", the "lending unit", the "deal view(DV)").

In accordance with some aspects and embodiments of the invention, wherein the data or data statistics about the company are displayed to the company and/or to other companies and/or to the lenders.

In accordance with some aspects and embodiments of the invention, wherein the data system includes a scoring module that assigns the company one or more overall risk ratings or scores or a lending decision.

In accordance with some aspects and embodiments of the invention, wherein the scoring module is or contains a machine-learning (ML) module as part of the scoring pipeline.

In accordance with some aspects and embodiments of the invention, wherein a loan to a company can be fulfilled by a plurality of lenders that constitute a lender pool, such that each lender is entitled to a portion of the due payments that is directly proportional to the lender's contribution to the pool In accordance with some aspects and embodiments of the invention, wherein a loan to a company can be fulfilled by a plurality of lenders that constitute a payee queue, such that the lenders are compensated in a specific order as payments are collected In accordance with some aspects and embodiments of the invention, where a loan's plurality of lenders (pool or queue) is dynamic and can change by manual request of a lender and/or automatically by matching the company's parameters, data, or risk assessment with the lenders' preferred parameters or investment criteria.

In accordance with some aspects and embodiments of the invention, where the data system is configured to (re)assess the company with a frequency ranging from "only once" to "several times per second."

In accordance with some aspects and embodiments of the invention, the system includes a marketplace system wherein a lender's ownership of a loan or, in the case of a plurality of lenders, a lender's (part of) share in the pool or position in the payee queue, can be transferred to a different lender upon the holding lender's request.

In accordance with some aspects and embodiments of the invention, wherein the positions of the lenders in a queue can be traded, i.e. transferred in exchange for money, or swapped with other positions, etc.

In accordance with some aspects and embodiments of the invention, the marketplace system allows the lenders to list their positions for sale, and view and buy others' positions and/or make offers. In accordance with some aspects and embodiments of the invention, wherein the positions (or the subset of positions that are listed for sale at any given time) are stored in a central computer database controlled by the Platform.

In accordance with some aspects and embodiments of the invention, the system includes a marketplace system wherein the positions (or the subset of positions that are listed for sale at any given time) are stored in a decentralized network, such as inside a blockchain transaction data or inside the storage layer of a smart contract.

In accordance with some aspects and embodiments of the invention, wherein the blockchain is Ethereum or an EVM-equivalent or EVM-compatible blockchain (such as BNB Smart Chain, Avalanche, Tron, Polygon, Optimism, Arbitrum) or Non-EVM compatible blockchain (such as Bitcoin, Solana, Cardano, Algorand, EOS, NEO).

In accordance with some aspects and embodiments of the invention, the system includes a smart contact, wherein the smart contract, in addition to permitting the lenders to trade or transfer their positions, also performs part or all of the actions of systems payment unit and/or lending unit, such as providing the company with the funds from the lenders in the form of cryptocurrency, disbursing the payments to the lenders according to the loan schedule or pool ownership or payee queue, update the pool ownership and the payee queue as needed, etc.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code including instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WIFI, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media including any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features.

Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A system for assetizing a future revenue for financing payments, the system comprising:
    a payment software module, wherein the payment software module unit accesses the future revenue to manage the future revenue associated with a company;
    a risk software module for processing and analyzing the future revenue to generate a risk profile, wherein the risk software module is trained using at least one of historical accounting data, billing data, metrics and analytics, and CRM data; and
    a lending software module in communication with the payment software module, the lending software module communicates with the risk software module and automates risk assessment and decision making to forecast and compute one or more risk scores for the company based on the lender's configured lending preferences and the lending software module provides funds from at least one lender to the company, wherein the funds are provided to the company in accordance with a set of rules for providing payments to the at least one lender,
    wherein the company provides the payment software module with information about the future revenue and the payment software module collects the future revenue prior to delivery of the future revenue in exchange for receiving funds from the lending software module, which funds are provided by the at least one lender, and
    wherein the set of rules for the payments to the at least one lender are communicated to and used by the payment software module to manage and assign the future revenue according to the set of rules for payment, thereby assetizing the future revenue and wherein risk for the at least one lender, of receiving the payments in the future, is lowered because the future revenue is managed by the payment software module.

2. The system of claim 1, wherein the lending software module sends a portion of the future revenue to the at least one lender providing the funds as repayment of a loan.

3. The system of claim 1, wherein the lending software module provides funds to at least one borrower and payments by the at least one borrower are covered, at least in part, by accounts receivable of the company and controlled by the payment software module.

4. The system of claim 1, wherein the payment software module includes at least one of:

a debt collection system;
an invoicing system, wherein the invoicing system invoices the company directly and controls funds from future revenue;
a payment gateway, and
a direct debit system that can access future payment from customers of the company.

5. The system of claim 1, wherein the lending software module includes at least one of:
a fixed-term loan processor;
a revenue-based financing processor;
a direct-payment processor; and
an invoice-based processor.

6. The system of claim 1 wherein the lending software module includes an invoice-based processor such that the funds provided to the company are based on invoice-based financing and at least one lender provides an agreed annual value of a company's invoice in exchange for full access to future payments that are invoice-based.

7. The system of claim 1 further comprising at least one of:
a data collection system; and
a machine learning module.

8. The system of claim 1 further comprising a data system including a risk assessment system, wherein the risk assessment system provides a risk profile for the company to the risk software module to improve decision-making process regarding risk assessment and decision making for providing funding to the company.

9. The system of claim 8, wherein the risk profile includes parameters in order to automatically trigger financing money and an algorithmic computation of loan parameters based on configured financing preferences or criteria of the at least one lender.

10. The system of claim 8, wherein information used by the data system includes one or more of the company's: accounting data, revenue history, billing data, banking transactions, CRM data, financial statements, custom questionnaires, global economy data.

11. The system of claim 1, wherein a holding lender has a share of revenue in a payee queue that can be transferred to a different lender upon a request to transfer from the holding lender.

12. The system of claim 11, wherein the request to transfer is in exchange for one of money and swapping for another position.

13. The system of claim 1, wherein the company is a client receiving services from a provider.

14. The system of claim 1, wherein the company is a service provider to a client.

15. A method for converting a future revenue of a company into an asset in order to assetize the future revenue for payments, the method comprising:
obtaining, at a payment software module, information from the company, wherein the information identifies and allows access to a future revenue of the company;
analyzing, using a risk software module, the future revenue to generate a risk profile, wherein the risk software module is trained using at least one of historical accounting data, billing data, and CRM data;
analyzing, at the payment software module, contract conditions provided by a lending software module, wherein the lending software module communicates with the risk software module to automate risk assessment and decision making by using data collected by a data collection module to forecast and compute one or more risk scores for the company based on configured lending preferences and wherein the contract conditions are associated with funds that are provided to the company by at least one lender;
accessing, using the payment software module, the future revenue of the company to collect the future revenue based on the contract conditions prior to the company receiving the future revenue;
distributing, using the payment software module, at least a portion of the future revenue to the at least one lender as a payment;
sending, using the payment software module, a remaining portion of the future revenue to the company; and
communicating, to the lending software module and from the payment software module, distribution information related the portion of the future revenue that was sent to the at least one lender.

16. The method of claim 15, wherein the contract conditions include requiring the company to use the payment software module to manage the future revenue according to the contract conditions that include a set of rules for portions of the future revenue that are to be allocated, thereby the company assetizes the future revenue so that risk of receiving payments in the future, to the at least one lender, is lowered because the future revenue is managed by the payment software module.

17. A system for assetizing a future revenue of a company for securing a loan from at least one lender, the system comprising:
a lending software module for providing funds from one or more lenders to the company, wherein the funds are provided to the company in accordance with one or more contract conditions to identify requirement for providing payments from the company and the lending software module includes a risk model to automate risk assessment and decision making by using data collected by a data collection module to forecast and compute one or more risk scores for the company based on the lender's configured lending preferences, wherein the risk model is trained using at least one of historical accounting data, billing data, metric analytics, and CRM data; and
a payment software module in communication with the lending software module, wherein the payment software module receives the one or more contract conditions, from the lending software module, receives access information, from the company, to the future revenue and manages the future revenue in accordance with the one or more contract conditions,
wherein the company provides the historical accounting data, which is associated with one or more customers, to the risk model and at least one of the lending software module and the one or more lenders thereby allowing determination of a partial risk score for one or more portions of the future revenue, wherein each portion of the one or more portions of the future revenue are linked to each one of the one or more customers thereby one or more portions of the future revenue are assetized by collecting the future revenue prior to the company receiving possession of the future revenue.

* * * * *